United States Patent [19]

Billett et al.

[11] 4,324,108
[45] Apr. 13, 1982

[54] APPARATUS FOR FREEZING CONFECTION MATERIAL

[75] Inventors: Ronald J. Billett, Sunnyvale; Veikko K. Viitanen, San Jose, both of Calif.

[73] Assignee: FMC Corporation, Chicago, Ill.

[21] Appl. No.: 146,932

[22] Filed: May 5, 1980

[51] Int. Cl.³ .............................................. A23G 5/02
[52] U.S. Cl. ..................................... 62/345; 62/375; 62/433
[58] Field of Search ................. 62/345, 375, 433, 435; 165/117

[56] References Cited

U.S. PATENT DOCUMENTS

| | | | |
|---|---|---|---|
| Re. 22,917 | 9/1947 | Chamberlain | 62/435 X |
| 2,614,403 | 10/1952 | Heise | 62/160 |
| 2,685,177 | 8/1964 | Wagner | 62/114 |
| 2,791,890 | 5/1957 | Hoyer | 62/114 |
| 2,884,875 | 5/1959 | Rasmusson | 62/345 X |
| 3,031,978 | 5/1962 | Rasmusson | 107/8 |
| 3,213,935 | 10/1965 | Reid, Jr. | 165/117 |
| 3,535,869 | 10/1970 | Curti | 62/322 |
| 3,763,661 | 10/1973 | Betschart et al. | 62/345 |
| 3,791,163 | 2/1974 | Dickson et al. | 62/347 |

Primary Examiner—William E. Tapolcai, Jr.
Attorney, Agent, or Firm—Louis J. Pizzanelli; Richard B. Megley

[57] ABSTRACT

An apparatus for freezing confection material includes a plurality of separate mold strips which are indexed in a closely spaced single file over several longitudinally spaced, transversely extending rows of nozzles. Coolant is forced upwardly from the nozzles in single vertical jets which impinge perpendicularly against the mold strips midway between adjacent mold cups. The mold cups are arranged with their wide side faces extending in their direction of travel, and the single jets of coolant impinge upon wall portions of the mold strips which extend transversely between such opposing wide side faces. The heat exchanger for refrigerating the coolant includes a vertically super-imposed array of heat exchanger tubes that is located directly under the mold cups so that the coolant will drip from the mold cups onto the heat exchanger tubes. The coolant then cascades from upper to lower heat exchanger tubes and is refrigerated by the time it trickles into a collection housing situated below the heat exchanger. Mechanical seals are formed between the adjacent mold strips by intermeshing end walls of the mold strips; the seals enable the coolant to be continuously sprayed without concern that the coolant may be injected upwardly between the strips to contaminate the confection material.

5 Claims, 12 Drawing Figures

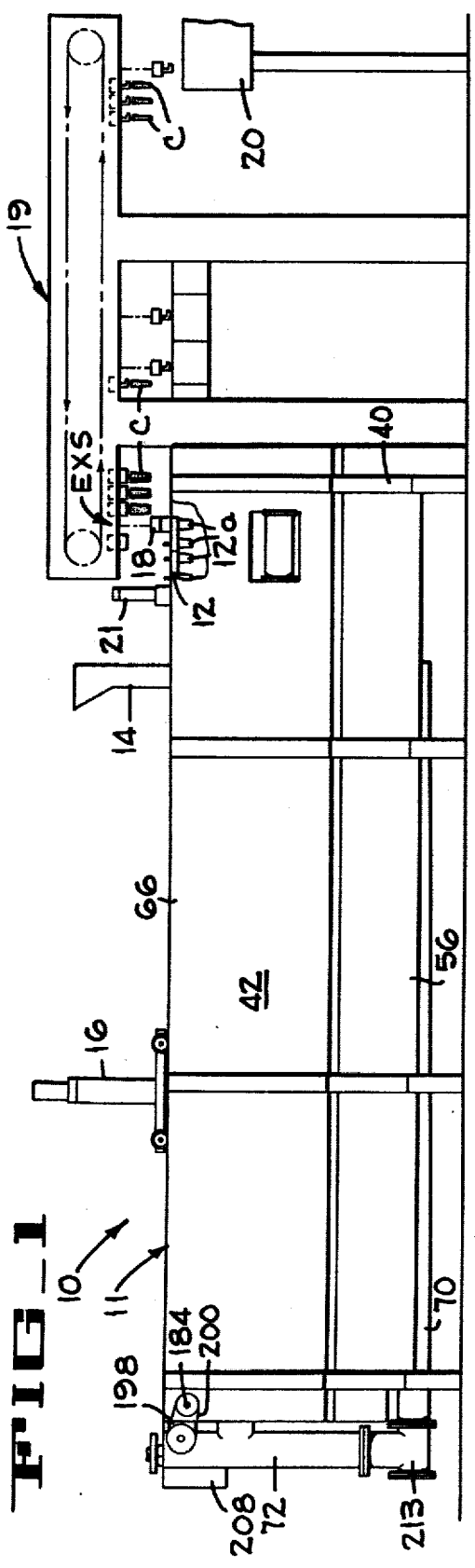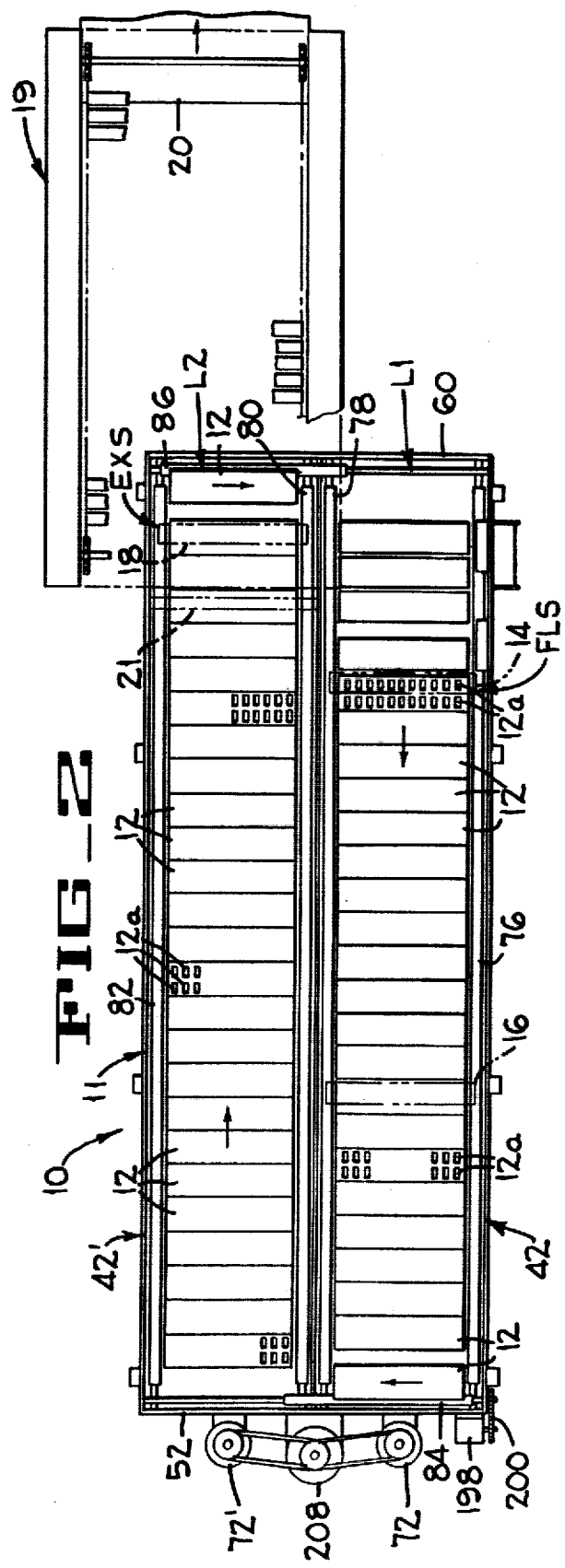

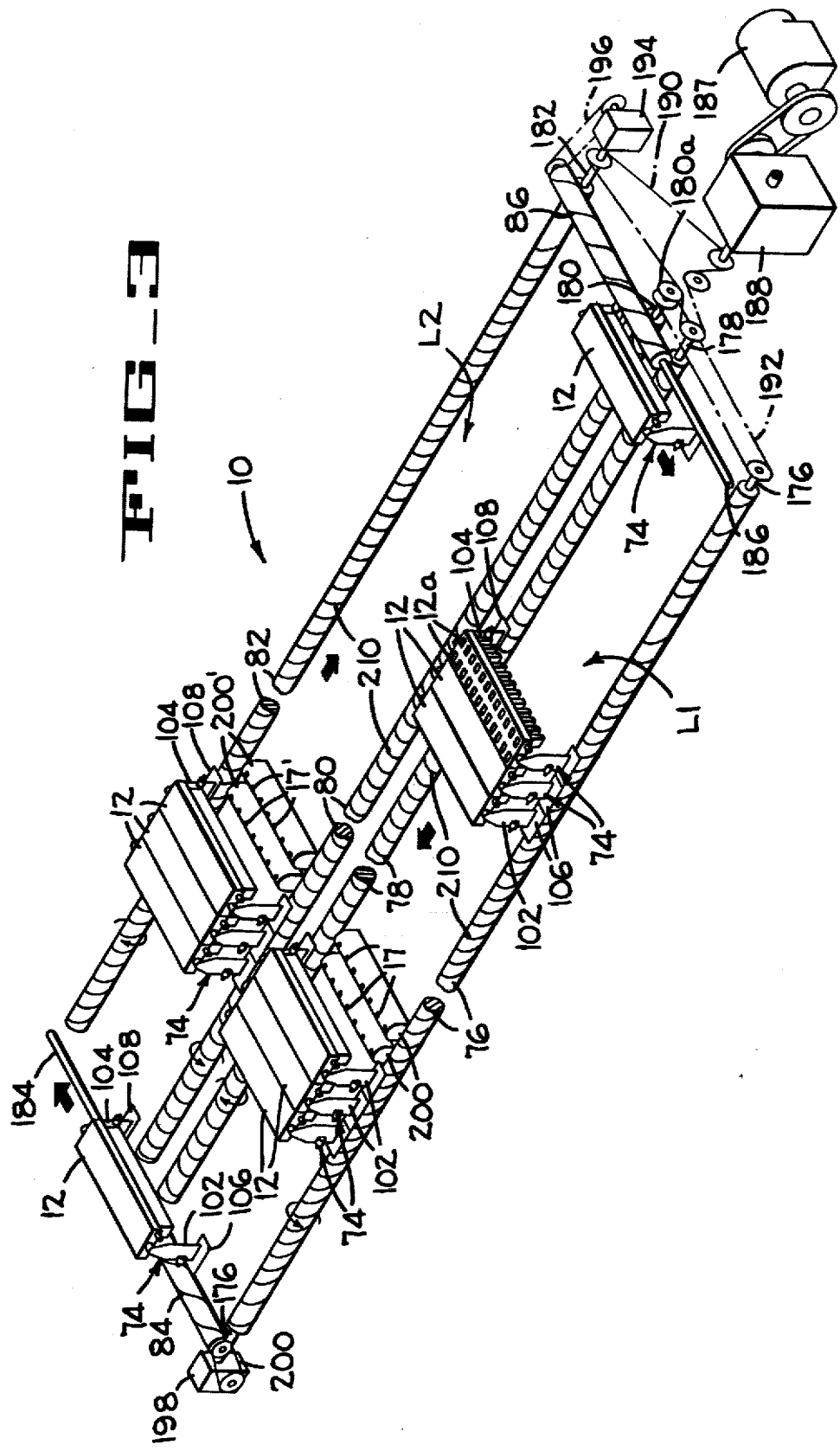

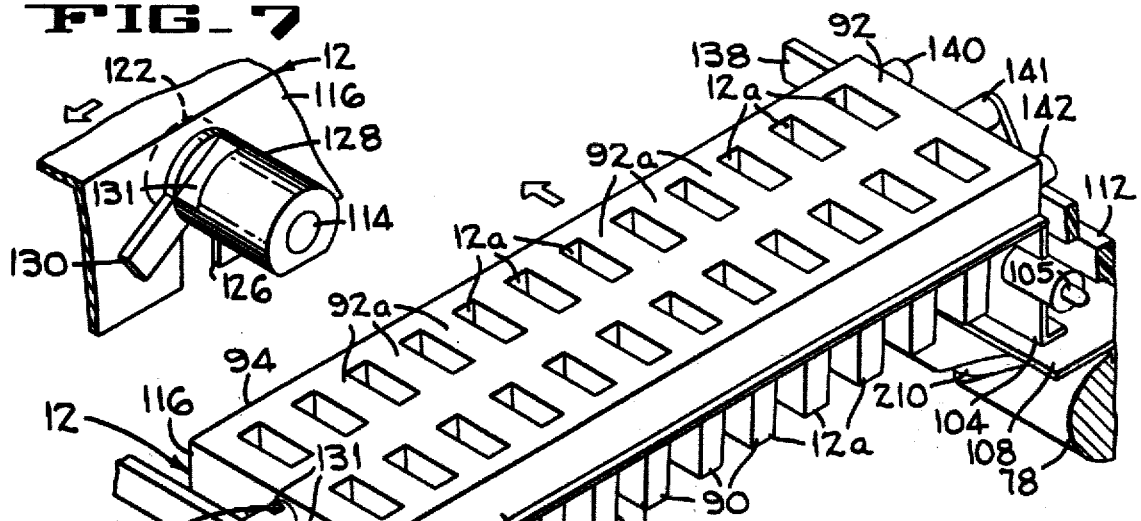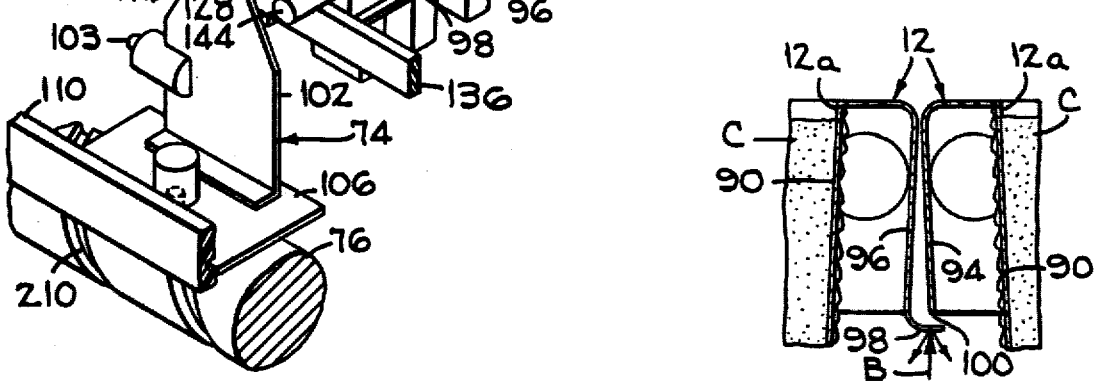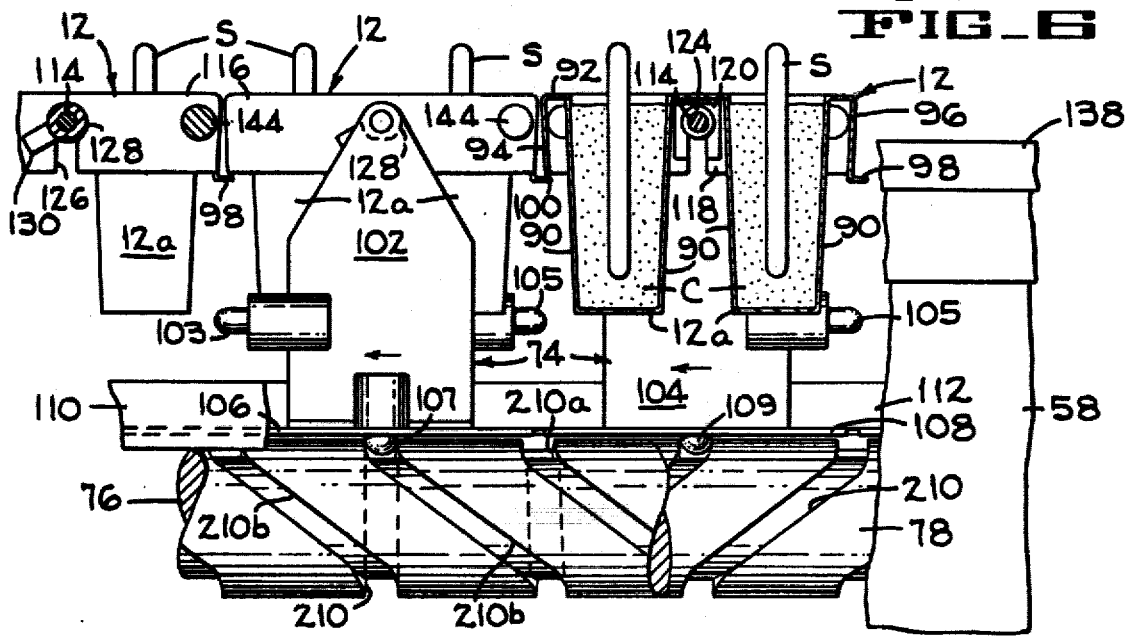

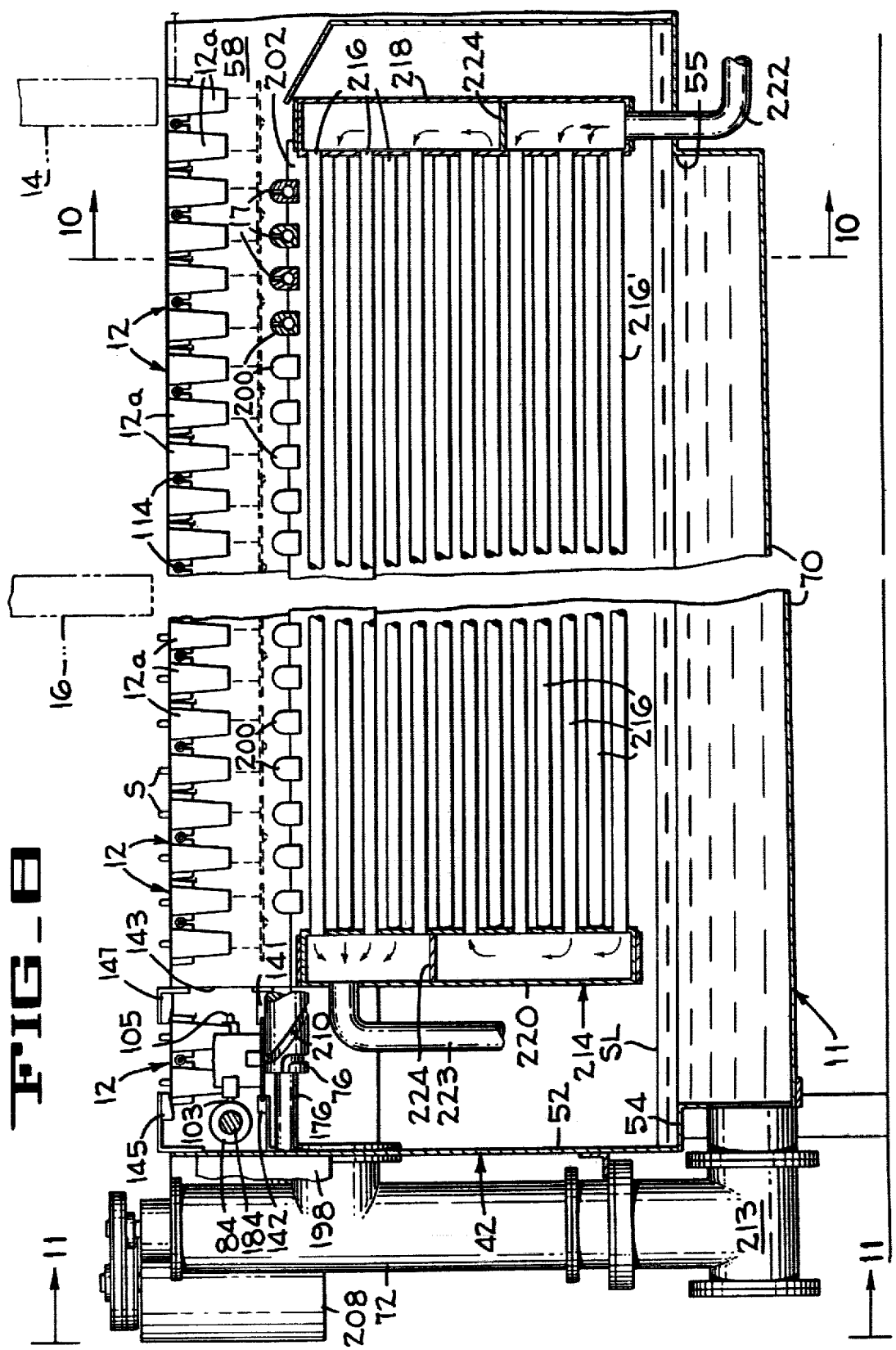

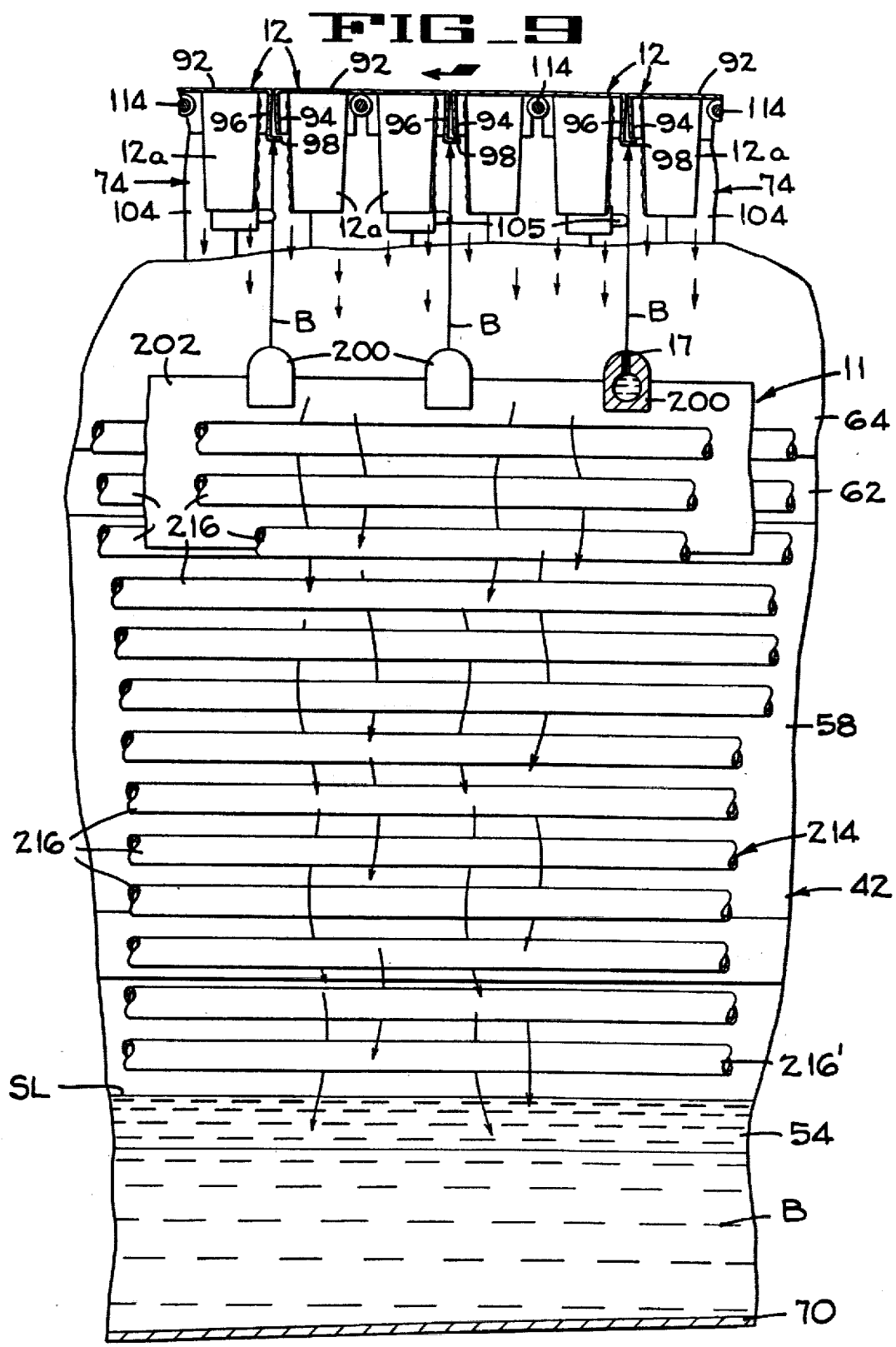

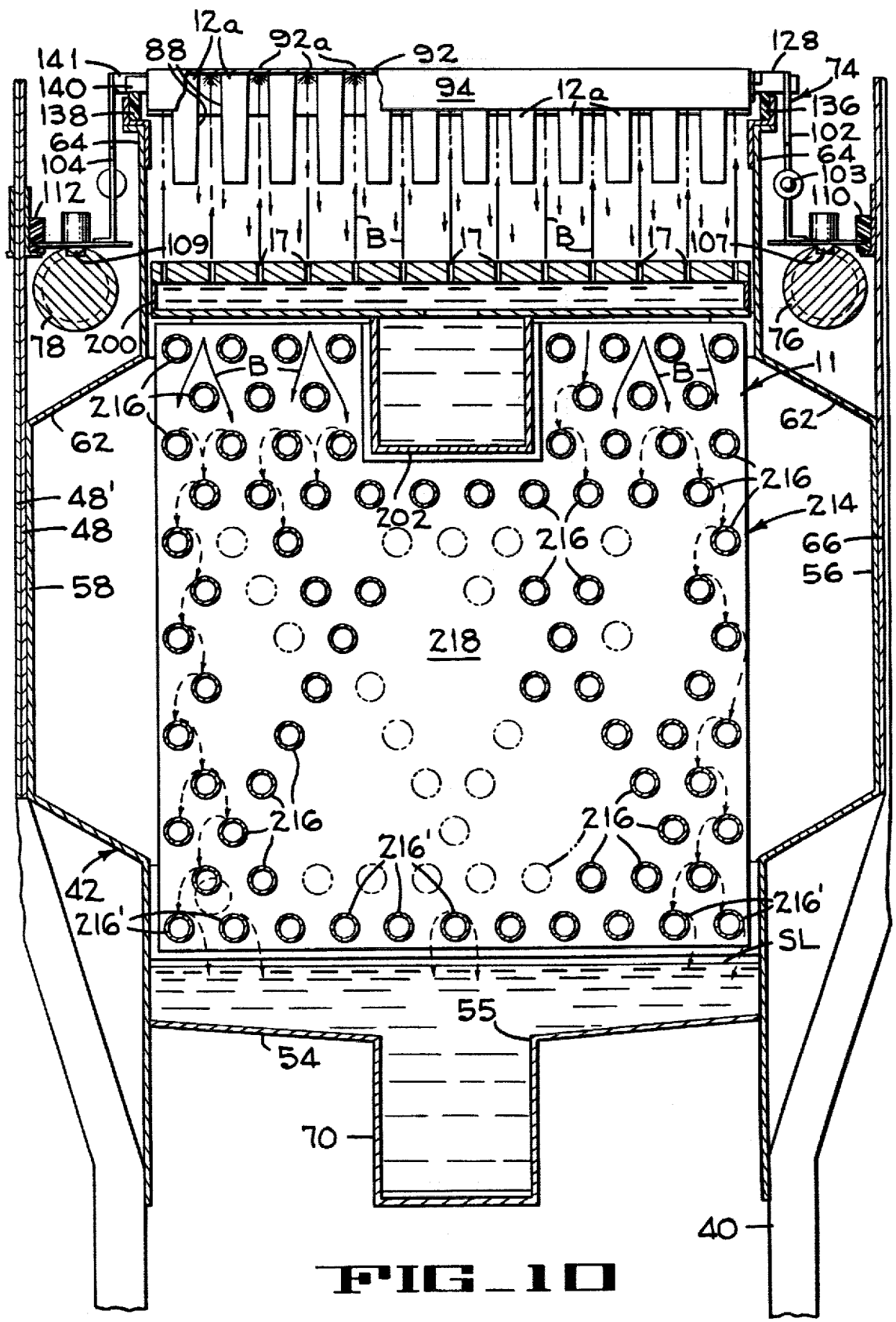
FIG_10

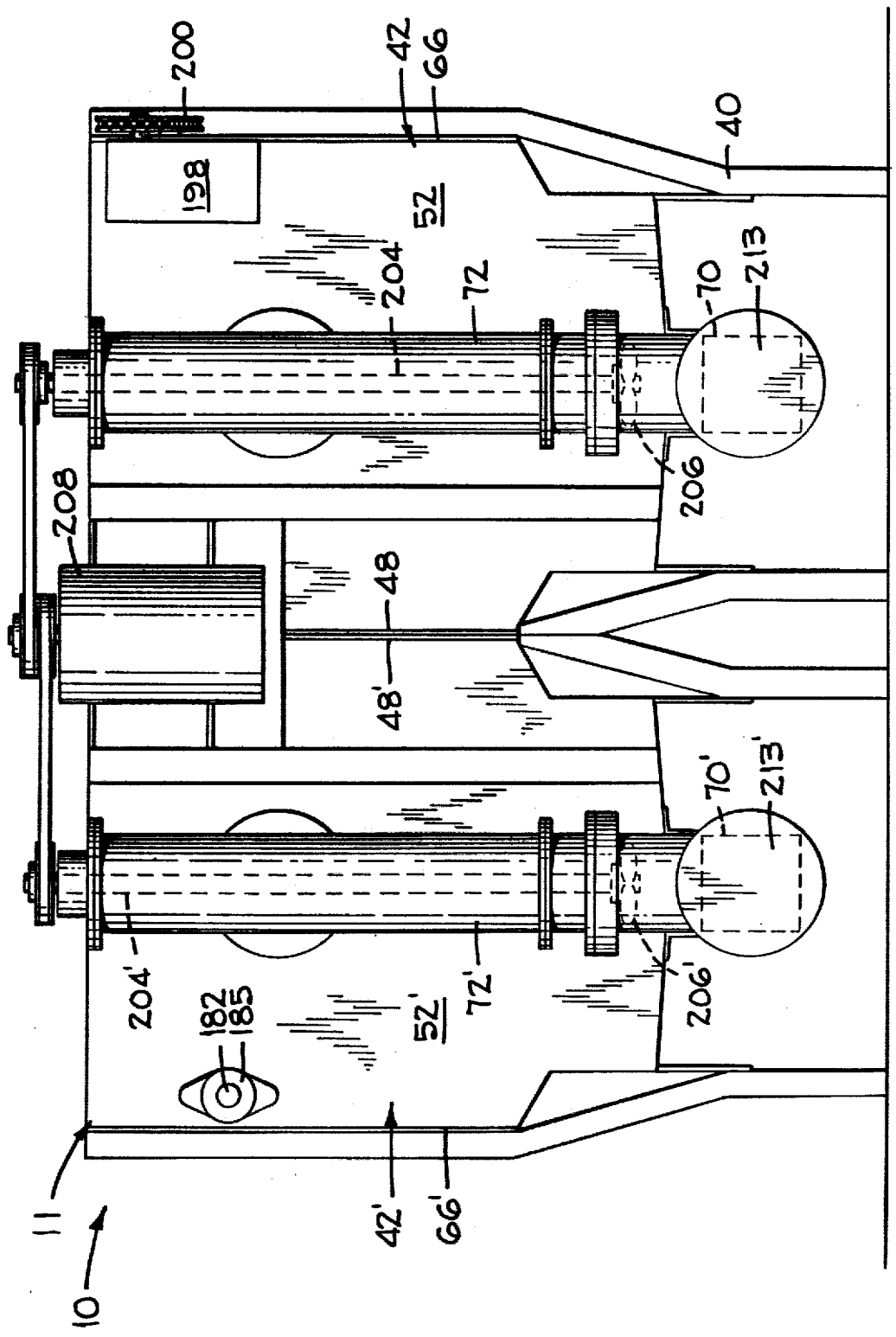

APPARATUS FOR FREEZING CONFECTION MATERIAL

BACKGROUND OF THE INVENTION

1. Field of the Invention

The present invention generally relates to an apparatus for producing confections, and more particularly, the present invention pertains to an apparatus for freezing confection material to thereby form frozen confections.

2. Description of the Prior Art

U.S. Pat. No. 3,031,978 to M. B. Rasmusson discloses an apparatus for freezing confection material comprising a plurality of elongate mold bars or strips, with each strip including a row of mold cups depending therefrom. Each mold cup has polygonal cross-sectional configurations adapted to the desired shape of the frozen confection, and the mold cups are arranged in a single row in each strip with the wider dimensions of the cups extending longitudinally of the mold strip (that is, parallel to the row of mold cups). The freezing apparatus further includes a coolant tank for containing a bath of coolant such as a brine solution and an endless chain conveyor for moving the mold strips in closely spaced sequence through the coolant tank with the mold cups extending downwardly into the coolant bath. The heat exchanger for refrigerating the coolant is located outside of the tank, and the coolant is pumped from the heat exchanger through a manifold in the bottom of the tank upwardly into the tank. It is noted that in this type of prior art confection freezing apparatus care must be taken in circulating the coolant within the tank due to the possibility that the coolant may be forced upwardly between the mold strips. Accordingly, the coolant is so circulated to maintain liquid level of the coolant bath at a distance significantly below the upper ends of the mold cups. Accordingly, the coolant does not surround the upper end of the mold cups, and thus confection material cannot be filled to the tops of the cups because the confection would not be completely frozen above the liquid level of the coolant bath.

In another type of apparatus for freezing confection material, as shown in U.S. Pat. No. 2,791,890 to O. G. Hoeyer, the mold cups are formed in a rather massive annular mold member and are arranged in a plurality of rows that extend radially of the mold member with the wider dimensions of the mold cups extending parallel to the rows in which they are formed. Liquid coolant is supplied to an annular supply and distribution container having a perforated upper wall which forms the bottom of a refrigeration tank. The annular mold member is rotated about its axis so that the mold cups move in a horizontal path through the refrigeration tank, and the coolant is supplied under pressure to the distribution container to cause the coolant to well up through the openings in the bottom wall of the tank. It is further noted that such frozen confection apparatus includes a refrigeration plant or heat exchanger for refrigerating the coolant that is located outside of the coolant distribution container, and the coolant is pumped from the heat exchanger into the distribution chamber of the freezing apparatus.

U.S. Pat. No. 3,535,889 to Curti discloses a rotary freezing apparatus that is generally similar to that of the Hoeyer U.S. Pat. No. 2,791,890. In the frozen confection apparatus of the Curti patent, a massive annular mold member having cups depending in the same radial relationships as in the aforementioned Hoeyer patent is rotated through an annular freezing tank in which coolant ducts are arranged below the mold cups. The coolant ducts have cover members provided with a plurality of holes arranged in a pattern according to the spacing between the mold cups. The duct cover members are provided with vertical side walls so that the coolant falling from the mold cups is retained in a shallow pool on the cover member, and coolant is pumped into the coolant ducts to well up through the holes in the cover member. As the coolant emanates from such holes, it agitates the retained coolant to cause the retained coolant to splash against the molds. The Curti patent states that such splashing action enhances the freezing of the confection material with the mold cups. It is further noted that, in contrast to the Hoeyer apparatus, the heat exchanger system for refrigerating the coolant in the Curti apparatus is situated under the coolant ducts. Such heat exchanger system includes a container for receiving a deep bath of brine that flows over the side walls of the coolant duct cover members, and the system further includes heat exchanger coils that are totally immersed within such deep bath.

U.S. Pat. No. 2,614,403 to W. E. Heise discloses a confection freezing apparatus wherein coolant is sprayed at an angle from the vertical against the bottoms of the mold cups. The apparatus includes a rectangular freezer tank formed with a plurality of longitudinal partitions which form alternate up-flow compartments and down-flow compartment. Refrigerating coils are arranged in both the up-flow and down-flow compartments. The mold members each include two rows of cups which extend longitudinally of the direction of travel thereof, and such mold members are moved over the up-flow compartments with the coolant being sprayed upwardly only between the rows of cups of the respective mold members.

SUMMARY OF THE INVENTION

According to the present invention, an apparatus for freezing confection material includes at least one mold member, but preferably a plurality of mold members or strips, and each mold strip comprises a row of mold cups depending from a support wall. A liquid coolant is directed upwardly in transversely spaced jets from several rows of nozzles. The nozzles are preferably spaced at intervals in each row to direct jets of the coolant between adjacent cups of each row with sufficient force to cause the jets to impinge against portions of the support wall of the mold strip between adjacent mold cups, rather than against the side walls of the mold cups. With this arrangement, each jet of coolant flows outwardly across the support wall toward the opposing side faces of adjacent mold cups and thereafter downwardly over such opposing side faces. According to the improvement of the present invention, the freezing apparatus further includes an array of vertically spaced heat exchanger tubes that are positioned directly under the spray nozzles and mold cups so that the coolant may flow from the lower ends of the mold cups directly onto the heat exchanger tubes. The coolant then cascades from upper to lower heat exchanger tubes in the array of tubes so that the coolant is refrigerated by the time it drips fom the lowest heat exchanger tubes. A coolant collection container is situated below the lowest heat exchanger tubes in the array to collect the refrigerated coolant, and the coolant is pumped directly from such container to the spray nozzles.

BRIEF DESCRIPTION OF THE DRAWINGS

FIG. 1 is a diagrammatic side elevation of the apparatus for freezing confection material of the present invention.

FIG. 2 is a diagrammatic top plan of the freezing apparatus of FIG. 1 with the extractor-conveyor being partially broken away and with the positions of the filler, stick inserter, pre-extractor and extractor assembly being shown in phantom outline.

FIG. 3 is an isometric diagrammatic view of the drive arrangement for the freezing apparatus.

FIG. 4 is an enlarged fragmentary isometric view of a mold strip of the freezing apparatus together with the conveyor cradle to which it is removably and pivotably attached.

FIG. 5 is an enlarged fragmentary diagrammatic side elevational view in partial section that illustrates several mold strips, mold cradles and the associated conveyor screws and cradle guide tracks.

FIG. 6 is an enlarged fragmentary sectional view illustrating the intermeshed end walls of adjacent mold strips.

FIG. 7 is an enlarged fragmentary perspective view that depicts the mechanism for detachably and pivotably connecting a mold strip to a cradle.

FIG. 8 is a fragmentary sectional view taken longitudinally through the filling lane of the confection freezing apparatus, with a portion of the apparatus being broken away and removed and with the positions of the filler and stick inserter being shown in phantom outline.

FIG. 9 is an enlarged fragmentary sectional view that illustrates the confection freezing apparatus wherein the mold strips moving between their dwell positions.

FIG. 10 is an enlarged secton taken on line 10—10 of FIG. 8 that is partially broken away.

FIG. 11 is an end elevation taken in the direction of the arrows 11—11 of FIG. 8.

DESCRIPTION OF THE PREFERRED EMBODIMENT

Figure 12:
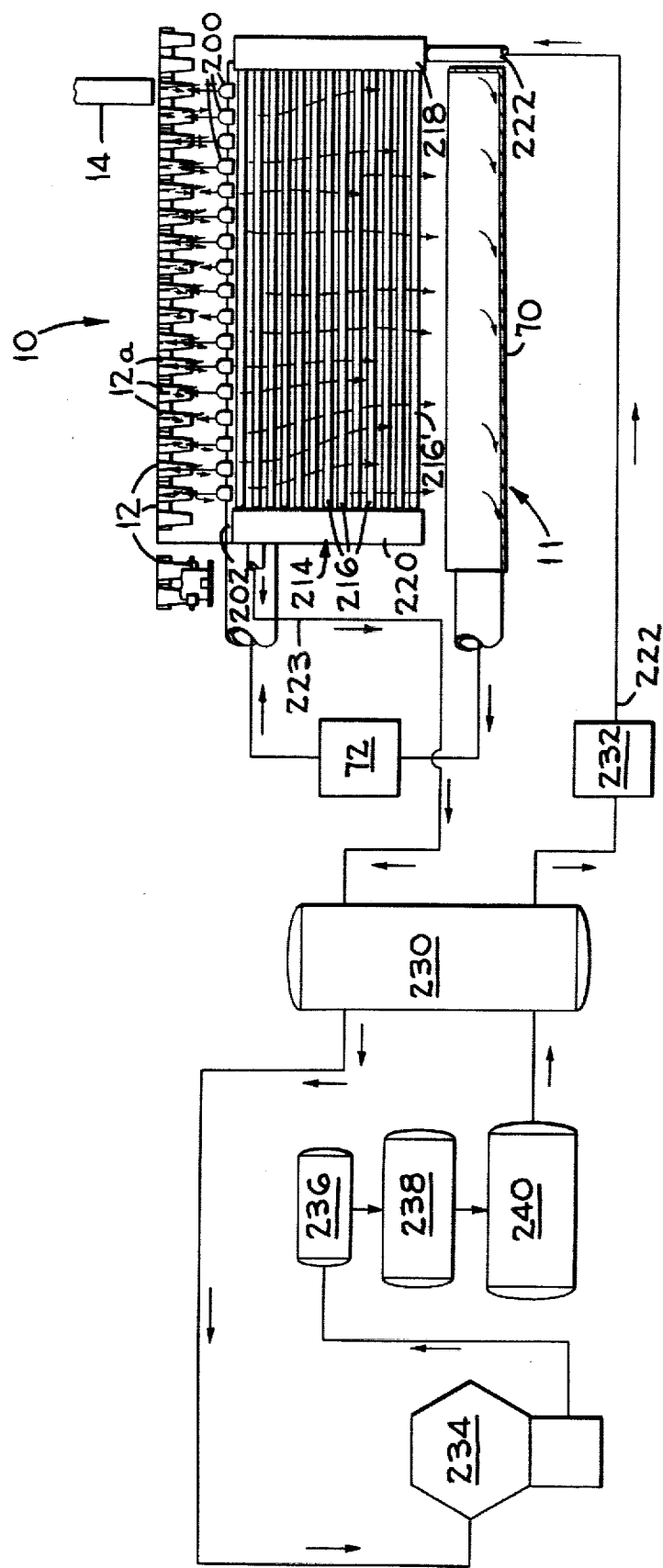
FIG. 12 is a diagrammatic view illustrating the cascade heat exchanger system of the freezing apparatus.

Referring now more particularly to FIGS. 1-3, there is shown a system 10 for producing frozen confections C of the type including a bar or block of confection material haing a stick S partially embedded therein (FIG. 5). System 10 generally includes a freezing apparatus 11 that includes a plurality of removable elongate mold strips 12 and a conveyor including several conveyor screws 76-86 for indexing the mold strips through a rectangular path of travel. The rectangular path of travel comprises relatively long, parallel, closely spaced filling and extraction lanes L1 and L2, respectively, and short lateral transfer legs extending from one lane to the other at the ends of the filling and extraction lanes. At a filling station FLS near the upstream end of filling lane L1, confection material is deposited into the cups or compartments 12a of the mold strips by a filler 14. The confection material is thereafter partially frozen by means of cold brine being upwardly directed in jets from freezer nozzles 17 against the bottoms of the mold strips, as hereinafter described in detail. The sticks S are inserted into the confection material by an inserter 16 after the confection material has been partially frozen. It should be noted that the position of the stick inserter is dependent on the freezing rate of the confection material; for confections that have a slow freezing rate, the inserter will be positioned in the extraction lane L2.

The extracting lane L2 comprises the third leg of the rectangular path of travel of the mold strips, and in this lane, the confections are completely frozen also by means of jets of brine that are upwardly directed against the mold strips from nozzles 17' positioned under the mold members. After being completely frozen, the frozen confections are separated from the mold strips at an extraction station EXS by the extractor mechanism 18 of an extractor-conveyor 19 at an extractor station EXS that is located closely adjacent the downstream end of the extracting land L2. The extracted frozen confections are then transferred by the conveyor of the extractor-conveyor to a wrapper 20 (shown in part). The empty mold strip is then conveyed through the end transfer leg extending between the downstream end of the extraction land L2 and the upstream end of the filling lane L1.

Preferred forms of the stick inserter 16 and the extractor-conveyor 18 are disclosed in the following co-owned patent applications: the inserter 16 is disclosed in a copending U.S. patent application Ser. No. 146,935 that is concurrently filed by B. M. Harper et al and that is entitled "Inserting Sticks Into Confections"; the extractor-conveyor 18 is disclosed in a copending U.S. patent application Ser. No. 146,844 that is concurrently filed by S. D. Cross et al and entitled "Stick Confection Extraction Apparatus". The disclosures of these applications are incorporated herein by reference, and reference may be made to these applications for details of construction of the stick inserter and extractor-conveyor. It is further noted that the filler 14 is constructed generally in accordance with the disclosure of U.S. Pat. No. 2,850,051 to M. B. Rasmusson, with, however, the filler spouts (not shown) being adapted to the relatively reduced spacing between the mold cups 12a, as hereinafter discussed. The extractor-conveyor 18 and stick inserter 16 operate generally as described in the aforementioned U.S. Pat. No. 3,031,978 to Rasmusson. It is noted that the preferred inserter is adapted to insert sticks at closer spacings and in different orientations relative to the direction of travel of the mold strips 12 and that the extractor-conveyor accommodates such stick spacing and orientations.

A pre-extractor 21 is positioned upstream of the extractor-conveyor 18 for loosening the frozen confections from the mold cups 12a to enable the extractor-conveyor to readily remove the confections. The pre-extractor includes a defrost spray mechanism similar to the mechanism of U.S. Pat. No. 3,695,895 to J. S. Brown for directing hot water against the undersides of the mold cups to enable the confections to be separated and an extractor assembly that includes spring-loaded grippers for individually biasing the confections to extract the confections. Such pre-extractor and the process of extraction is disclosed in a copending U.S. patent application Ser. No. 146,814 that is concurrently filed by R. J. Billett et al entitled, "Method Of And Apparatus For Extracting Frozen Confections"; and the disclosure of such application is incorporated herein by reference.

Having thus generally described the confection producing system 10, the construction of the freezing apparatus 11 will be described in detail. Referring to FIGS. 1 to 8, 10 and 11, the freezing apparatus 10 will be seen to include a tubular frame 40 adapted to support two tanks 42 and 42' (FIG. 11) above the floor. It will be noted that the components of the tank 42' that are similar to the like components of tank 42 are given prime designations. The two tanks are supported on the frame adjacent each other with walls 48 and 48' sandwiched between the tanks (FIGS. 10 and 11). Each tank includes end walls 52 and 60 (FIGS. 2 and 11), a bottom wall 54 (FIGS. 8, 10 and 11), and side walls 56 and 58. As illustrated in FIG. 10, the tank side walls include inwardly tapered portions 62 and vertical upper end portions 64. An exterior wall 66 that extends the length of the apparatus is mounted between the frame 40 and outermost tank side wall 56 (FIGS. 10 and 11). An opening 55 is formed longitudinally at the center of the bottom wall 54 of each tank, and a trough 70, 70' is mounted to the bottom wall 54 below such opening to receive cooled brine and direct it back to a pump 72, 72' as will be described hereinafter.

Referring to the diagrammatic illustration of FIG. 3, it will be seen that the mold strips 12 are pivotally and detachably received on carriers or cradles 74 adapted to transport the mold strips in a horizontal plane through the aforementioned rectangular path and over the tanks 42 and 42' with the mold strips being closely adjacent to each other and extending transversely of their direction of travel in filling and extracting lanes L1 and L2. The cradles are intermittently driven or indexed over the tank 42 in the filling lane L1 by the pair of parallel transversely spaced conveyor or indexing screws 76 and 78, and the cradles are indexed in the lane L2 over the tank 42' by the pair of parallel indexing screws 80 and 82. As a cradle arrives at the downstream ends of the screws 76 and 78, it is brought into engagement against the end transfer conveyor screw 84, which screw is perpendicular to and above the ends of screws 76–82 (FIG. 8). The screw 84 pushes a single cradle laterally from engagement with the conveyor screws 76, 78 into engagement with the conveyor screws 80, 82. At the downstream end of the extraction lane L2, the other end transfer conveyor screw 86 is mounted at a right angle to the indexing screws to push the cradle that has been brought into engagement therewith by the screws 80, 82 from such screws laterally into engagement with the screws 76 and 78, so that they may be recirculated through the rectangular path of travel described by the conveyor screws.

Before going on to describe the screw conveyor arrangement in more detail, the construction of the mold strips 12 and cradles 74 will be set forth. Referring to FIGS. 4–7, each mold strip has an identical construction and includes two rows of mold cups 12a. The illustrated mold cups have rectangular cross-sectional configurations suitable for producing ice cream bars. The rows of cups are formed in the mold strips so that the relatively wide side walls 88 of the cups oppose each other in a face-to-face relationship at uniform relatively close intervals along the length of the mold strip (FIG. 5). Accordingly, the relatively narrow end walls 90 of the mold cups extend longitudinally of the mold strip. This mold cup arrangement minimizes the over-all width of the freezing apparatus 11 and the time required for the mold strips to be laterally transferred between lanes L1 and L2. The sticks S are normally inserted so that their flat faces extend in the direction of travel of the molds (FIG. 6).

Each mold strip 12 includes a flat rectangular top or support wall 92 from which the mold cups 12a depend, a forward or upstream side wall 94 extending downwardly from the leading edge of the top wall, and a rearward or downstream side wall 96 extending downwardly from the trailing edge of the top wall. As shown in FIG. 6, the downstream side wall 96 of each mold has a flange or lip 98 extending outwardly and rearwardly from the lower end thereof, and the upstream side wall 94 of each mold terminates in a plain straight edge 100. It will be noticed the flange 98 overlaps the edge 100 in an intermeshing or overlapping relationship when the molds are carried through the freezing sections over the freezer nozzle 17 and 17'. This overlapping flange configuration provides a baffle of mechanical seal for preventing brine B from being sprayed upwardly between the molds, to thereby contaminate the confection C in the cups 12a with the brine.

The mold strips 12 are detachably mounted to the cradles 74 so that they may be coveniently removed and so that other mold strips for producing a different type of confection may be quickly installed on the cradles. Moreover, the mold strips are pivotally mounted on the cradles so that the cups 12a normally depend from the top wall 92 and so that they may be pivoted 180° in one rotative direction by turn-over device and thereafter in the opposite direction by the turn-back cam of a selective mold cleaning system. Such mold cleaning system is disclosed in the copending application Ser. No. 146,931 of R. J. Billett et al that is entitled, "Apparatus For Producing Frozen Confections" and that is filed on even date herewith; the disclosure of this application is also incorporated herein by reference.

Referring to FIGS. 5 and 6, each cradle includes leg plates 102 and 104 that have generally triangular upper ends. The lower ends of the leg plates 102 and 104 are fixed to feet or slide plates 106 and 108, respectively. Referring to FIGS. 4 and 5, the outer edges of the slide plates are received in grooves formed in a rectangular array of plastic guide tracks, including guide tracks 110 and 112 that are horizontally attached to the outside walls 66 and 48 respectively (FIG. 10). It may be noted the guide tracks do not support the entire weight of the cradles; the cradles are slidably supported in the lanes L1 and L2 on plastic support strips or rails 136 and 138 that are mounted to the tank side walls 64 (FIG. 10).

The cradles 74 further include rounded lugs 107 and 109 (FIGS. 5 and 10) that vertically depend from the slide plates 106 and 108, respectively, and rounded lugs 103 and 105 (FIGS. 4 and 5) that project horizontally in opposite directions from the leg plates 102 and 104, respectively. The lugs 107 and 109 of a cradle are respectively received in the grooves 210 of the indexing screws 76 and 78, respectively, when the cradle is in the filling lane L1, and such lugs are similarly received in the grooves of the screws 80 and 82 as the cradle is propelled through the extraction lane L2. As shown in FIG. 10, the depending lugs are arranged so they project vertically downwardly over the centerline of the indexing screws. The lug 103 is, as shown in FIG. 8, mounted to extend horizontally through the centerline of the end transfer screw 84 to enable the screw to push the cradle from the filling lane to the extracting lane. Similarly, the lug 105 of a cradle will be brought into engagement with the end transfer screw 86 when the cradle has been indexed into the downstream end or transfer position in the extracting lane L2.

As shown in FIG. 8, the leading edges of the base plates 106 and 108 of a cradle 74 are received in a groove in an outer guide track 142 when the cradle is indexed to the ends of the screws 76 and 78 and into engagement with the transfer screw 84. A similar guide track (not shown) is also mounted to the end wall 60 to extend horizontally to support the mold strip as it is laterally transferred by the screw 86. The inner edges of the slide plates are received in an inner track 141 that is transversely mounted to the walls 56 and 58 of the tank 42 (FIG. 8). Tracks similar to track 141 and 142 are mounted at the other ends of the lanes L1 and L2 to guide the cradles in the end transfer legs.

Each cradle 74 further comprises a shaft 114 (FIGS. 4 and 5) that is rigidly connected between the leg plates 102 and 104, and the mold strips 12 are pivotally received on the shafts 114. The means for detachably connecting a mold strip 12 to a cradle 74 is illustrated in FIGS. 4 and 7. Each mold strip has end walls 116 and 118 and a central flange 120 (FIG. 4). The end wall 116 and the flange 120 have keyholes formed centrally therein with collars 122 and 124 being mounted on shaft 114 to be received in the rounded upper portions of the holes. The end wall 116, as shown in FIG. 5, has a keyhole 126 formed therein so that such end wall is adapted to be received on the inner end of a bushing 128 affixed upon the end of shaft 114. A lug 130 extends radially from the bushing at a position spaced from the innermost end of the bushing upon which the end wall 118 is received, the lug being affixed to the bushing top extend downwardly and forwardly in the direction of travel of the mold strip in the filling lane L1. Grooves or notches 131 are formed in the bushing just outside of the lug, such grooves being inclined from the horizontal and parallel to the lug. The straight lower part of the keyhole 126 is parallel to the mold cups. Accordingly, to remove a mold strip from the cradle, the mold strip must be pivoted clockwise until the straight part of the keyhole is aligned with the lug 130. Then, the mold strip may be pulled over the lug to align the end wall 116 within the grooves 131 so that the mold may be lifted from the cradle.

The mold strips 12 are prevented from tipping on the associated cradles 74 (except in the mold cleaning area at the upstream end of the filling lane L1) by means of dowel pins that extend outwardly of the strips and that ride on the support rails. As shown in FIG. 4, two dowel pins 140 and 142 project outwardly of the end wall 118 of each mold strip at the height of a bushing 141 mounted on the adjacent end of the cradle shaft 114 and the pins 140 142 and the bushing ride on the inner rail 138 when moving through lane L. The opposite end wall 116 of the mold strip has a relatively longer pin 144 extending therefrom at the height of the bushing 128, and such bushing and pin 144 ride on the outer rail 136 in lane L1. As shown in FIG. 8, an opening 143 is formed in the inner walls of the tank 42 and 42' and in the central walls 48 and 48' to permit the molds to be laterally transferred therethrough, with the inner rails 136 and 138 extending through the opening 143.

As a mold strip 12 is laterally transferred from lane L1 to lane L2, the strip is prevented from pivoting by plastic bars 145 and 147 (FIG. 12). Bar 145 is mounted to the end wall 52 to engage the leading edge of the top wall 92 of a strip and trailing end of the top wall of the strip is engaged by the relatively short bar 147. The construction of the indexing conveyor screws 76–86 and the drive assembly for simultaneously and continuously driving such screws will not be set forth. Conveyor screws 76–86 include shafts 176–186 respectively, extending from their ends (FIG. 3), and such screw shafts are received within bearings 185 (FIG. 11). The arrangement for synchronously and continuously rotating conveyor screws (FIG. 3) includes motor 186 connected through a right-angle speed reducer 188 to a chain 190. Chain 190 is entrained on sprockets connected to the shafts 178 and 182 to drive the screws 78 and 82 in the same direction. The chain 190 also engages the underside of a sprocket 180a at the end of the shaft 180 of the screw 80. A further chain 192 is entrained between a further sprocket on the shaft 180 and a sprocket at the end of the shaft 176. With this arrangement, the indexing conveyor screws 76 and 78 are continuously driven in the opposite direction and at the same speed, while conveyor screws 80 and 82 are also continuously driven in opposite rotative directions to move the cradles in the opposite direction as that in extraction lane L1.

Power for driving the end transfer screw 86 is provided by a right-angle gear box 194 connected to the shaft 182 and a chain 196 entrained between a sprocket on the output shaft of the right angle gear box 194 and the shaft 186 of the screw 86. Similarly, power for driving end transfer screw 84 is provided through a gear box 198 connected to the shaft 176 of the screw 76 and a chain 200 entrained between the output shaft of the gear box 198 and the shaft 184 of the transfer screw 84.

The grooves 210 of indexing conveyor screws 76–82 are configures to drive the cradles 74 and attached mold strips 12 in an intermittent manner. Generally, the screws have grooves formed therein to cause the molds to dwell at the filler 14, stick inserter 16, pre-extractor 21 and extractor-conveyor 18 and to convey the mold strips with controlled acceleration which prevents the confection material deposited by the filler to spill over the tops of the mold cups 12a. Also, the grooves in the indexing conveyor screws are adapted to maintain the mold strips in closely spaced relation when they are conveyed over the freezer nozzles 17 and 17' of the cooling systems within the tanks 42 and 42' respectively. By keeping the mold strips in a closely spaced relationship, brine is prevented from being sprayed upwardly between the mold strips by the overlapping end wall configuration shown in FIG. 6. Also, the indexing conveyor screws are designed to separate a cradle and mold strip from the trailing mold strip just prior to reaching the lateral transfer at the end of lane L1 or L2, as shown in FIG. 8. Such separation of the mold strip allows time for the mold strip to be laterally transferred without extending the dwell times in the operating lanes L1 and L2.

As particularly shown in FIG. 5, the grooves 210 are formed in the opposite screws 76 and 78 (and also in 80 and 82) to extend in opposite directions around the screws. As also shown in FIG. 5, the indexing conveyor screws include vertical dwell groove portions 210a that are spaced uniformly along the length of the screws 76–82 in the vicinity of the freezer nozzles 17 and 17'. The distance between dwell grooves 210a is equal to the distance between the centerlines of mold cups 12a; in the present embodiment. Since the mold cups are spaced by three inches, the dwell grooves are accordingly spaced by three inches to cause the cups to index forwardly three inches and to dwell for a period sufficient for the filling, stick insertion, pre-extraction and finally extraction. Forwardly sloped grooved portions 210b are formed between the dwell grooves to accelerate the cradles 74 forwardly with a preselected acceleration so that confection material will not spill out of the mold cups. In a specific example, the mold strips are indexed forwardly every two seconds. Accordingly, since the mold strips have twelve cups in each row of cups thereof, twelve frozen confections are produced by the frozen confection apparatus every two seconds.

Details of construction and operation of the jet freezing portion of the freezing apparatus 11 will now be described in connection with FIGS. 8–12. As previously indicated, a plurality of longitudinally spaced, transversely extending rows of freezer nozzles 17 and 17' are provided in the tanks 42 and 42' below the straight paths of travel of the mold strips 12 in the filling and extraction lanes. In the preferred embodiment, the nozzles are integrally formed in several manifold or tubes; in particular, the nozzles comprise bores 17 (FIG. 8) formed in nozzle manifolds or tubes 200 that are transversely affixed at their centers (FIG. 10) to a square header tube 202 that extends longitudinally of the respective tank at the centerline thereof. It will be seen that each nozzle manifold is an extruded tube having a relatively thick, rounded upper wall. Relatively long nozzle bores are formed in such upper wall to extend vertically upwardly at positions midway between the mold cups 12a (FIG. 10) so that single jets of brine (indicated by the arrows B in FIG. 10) impinge perpendicularly against the transverse wall portions 92a (FIGS. 4 and 10) of the mold strip support wall. Such transverse wall portions extend between the relatively wide side faces 88 of the mold cups. As shown in FIG. 8, the nozzle manifolds 200 are arranged on the central header tube 202 at uniform intervals thereon that are equal to the uniform intervals between the centerlines of the mold cups in their direction of travel; that is to say, in the aforementioned specific example wherein the mold cups are spaced at three inch intervals, the nozzle manifolds are also spaced from each other at three inch intervals.

As previously stated, the indexing screws 76 and 78 are configured to cause the mold cups 12a to dwell directly above the nozzle manifold bars (as shown in FIG. 8). Thus, as shown in FIG. 10, single jets of brine are forced vertically upwardly to impinge perpendicularly on the flat transverse wall portions 92a midway between the opposing wide faces 88 of adjacent mold cups in each row of the mold cups when the cups are caused to dwell. The single brine jets diverge outwardly from the spots where they impinge against such flat transverse wall portions, and roughly equal portions each jet of brine flow down the opposing wide side faces 88 of adjacent mold in each row of molds. Since brine at freezing temperatures is quite viscous, the brine will tend to adhere to the wide faces of the mold cups and flow smoothly thereover to absorb heat from the mold cups at a rapid heat transfer rate.

As shown in FIGS. 6 and 9, when the mold strips 12 are indexed forwardly from their dwell positions, the junctures between the adjacent mold strips will pass directly over the nozzles 17. When passing over the nozzle manifolds 20, the intermeshing or overlapping relationships of the edges of the opposing end walls 96 and 94 of adjacent molds prevents the brine from being injected upwardly between the molds as the molds are so indexed. In particularly, the brine jet B will be deflected by the flange or lip 98 formed on the lower edge of the trailing wall 96 of each mold strip (FIG. 6). It is further noted that the opposing end walls 94 and 96 of adjacent mold strips are rather long and diverge outwardly and downwardly. The length of these walls together with the wider spacing between the walls at their lower edges prevents any brine caught above the lip 98 from being urged upwardly between the walls. Moreover, as illustrated in FIG. 5, and as stated before, the cradles 74 are indexed forwardly by the indexing screws 76, 78 so that the intermeshing edge relationship is maintained as the cradles are indexed forwardly. It is further noted that the mold strips are prevented from pivoting on their respective cradles by the pins 140, 142, and 144 that ride upon the guide strips 136 and 138 (FIG. 7).

Cold brine is pumped into the header tube 202 by the pump 72 (pump 72' in tank 42'). As shown in FIGS. 8 and 11, the brine pumps are mounted vertically to the end walls 52, 52' of the tanks, and each has a central impeller shaft 204 having an impeller 206 (dashed outline) at the lower end thereof that is disposed below the surface of SL of the bath brine within the bottom of the respective tank. Both brine pumps are driven by a single motor 208 that is mounted between the pumps. The lower intake ends of the pumps are connected to T-shaped couplings 213, 213' which, in turn, are connected to conduits that respectively extend from the troughs 70, 70' of the respective tanks. Accordingly, refrigerated brine is pumped from troughs into the respective header tubes 202 and then from the freezer nozzles against the mold strips. The pumps are adapted to force the brine coolant into the nozzle manifolds 200 with sufficient force to cause the single jets of brine emanating from the nozzles to impinge perependicularly against the support wall portions approximately midway between the cups so that the jets generally do not strike the side faces of the mold cups, as stated before. This flow pattern assures an even flow of refrigerated brine downwardly from the tops to the bottoms of the wide side faces 88 of the mold cups in a manner which steadily and rapidly replenishes the brine that is in immediate surface contact with the mold cups.

The important feature of the freezing apparatus 11 of the present invention is that a tubular heat exchanger assembly 214 is positioned directly below the mold strips 12 and nozzle manifolds 200 and directly above the surface level SL of the brine within the respective tanks to receive brine that is relatively uniformly distributed from the mold cups and to cool or refrigerate the brine to selected freezing temperatures as the brine drips from higher to lower tubes within the heat exchanger assembly. The heat exchanger assembly 214 includes a plurality of horizontal tubes 216 mounted in a vertically superimposed and spaced relationship or array (FIG. 8–10). The tubes are arranged so that the brine which flows in droplet form from the lower ends of the mold cups 12a will trickle over the upper heat exchanger tubes and progressively therefrom to lower tubes within the array of tubes as shown by the curved arrows in FIGS. 9 and 10, so that the brine solution is cooled to a suitable low temperature by the time it drips from the lowermost tubes 216' into the bath of brine contained within the lower end of the tank. The refrigerated brine is then collected within the tank, circulated to the respective troughs 70, 70' and pumped by the respective pump 72, 72' back into the associated header tube for re-distribution against the mold strips and subsequent dripping and continuous circulating manner over the heat exchanger assembly. It is noted that the tank and trough have a sufficient depth so that the surface level SL of the brine solution is below the lowermost tubes 216'.

The tubular heat exchanger assembly 214 in each tank 42, 42' includes an inlet header box 218 to which the ends of tubes 216 are connected and a discharge header box 220 to which the opposite ends of the tubes are connected. An inlet conduit 222 is connected to the inlet header box at the lower end thereof, and an outlet conduit 223 is connected to the upper end of the outlet header box. As shown in FIG. 8, baffle walls 224 are provided in the header boxes to cause the heat transfer medium to first circulate through lower heat exchanger tubes 216' to the outlet header box 218, to thereafter circulate from header box 218 to box 220 through the intermediate heat exchanger tubes and to finally circulate through the upper heat exchanger tubes back to the header box 218.

The refrigerating system for circulating heat transfer fluid or coolant through the heat exchanger assembly 214 associated with both the filling and extraction lanes L1 and L2 is diagrammatically illustrated in FIG. 12. The refrigerating system is a single-stage liquid ammonia system that includes a low pressure receiver 230 from which liquid ammonia is pumped by a low head pump 232 into the inlet conduit 22 of the heat exchanger assembly 214. Gaseous ammonia is withdrawn through the outlet conduit 223 through the upper end of the low pressure receiver above the surface level of liquid ammonia therein to a compressor 234. The heat transfer fluid then flows from the compressor through an oil separator 236 into a condenser 238 and from the condenser into a through-type high pressure receiver 240. Liquid ammonia is then pumped from the high pressure receiver into the bottom of the low pressure receiver 230, from which liquid ammonia is transferred to the tubular heat exchanger assembly 214 as just described. The refrigerating system is adapted to lower the temperature of the brine solution cascading over the heat exchanger tubes 216 down to temperatures of approximately $-35°$ F.

It is noted that the confection freezing apparatus 11 includes insulation material surrounding the outside walls of the brine tanks 42, 42'. However, for purposes of clarity, such insulation is not shown in the drawings.

A principal advantage of the present invention is that the heat exchanger system for refrigerating the brine or coolant takes advantage of the uniform spray distribution of the coolant from the longitudinally spaced rows of nozzles and the resultant dripping from the rows of mold cups 12a. That is, since the heat exchanger tubes are positioned immediately below the nozzles 17, 17' and the mold cups in the vicinity where they are sprayed, the coolant is evenly distributed in droplet form over the entire array of heat exchanger tubes. This uniform coolant distribution assures that the coolant will steadily cascade from upper heat exchanges tubes 216 to lower heat exchanger tubes to assure a high heat transfer rate from the brine to the heat exchanger tubes.

Although the best mode contemplated for carrying out the present invention has been herein shown and described, it will be apparent that modification and variation may be made without departing from what is regarded to be the subject matter of the invention.

What is claimed is:

1. Apparatus for freezing confection material comprising:
   mold means including a plurality of upwardly open mold cups having sidewalls depending from the open upper ends thereof and terminating in closed bottoms,
   means for filling said mold cups with a predetermined quantity of freezable confection,
   means for conveying said mold means along a substantially horizontal path of travel through a freezing station,
   said freezing station having upwardly directed nozzle means disposed beneath said path of travel for spraying refrigerated liquid toward said mold cups for impingement thereagainst adjacent the said upper ends thereof, the refrigerated liquid thereafter flowing downwardly along the exterior surfaces of said mold cup sidewalls and bottoms to drain therefrom, thereby to freeze the confection received in said cups,
   said freezing station further having an exposed tubular heat exchanger means disposed beneath said nozzle means and said mold means for again refrigerating the liquid as the draining liquid flows downwardly thereover into a sump, and,
   means for recirculating the re-refigerated liquid from the sump to said nozzle means.

2. The apparatus of claim 1 wherein said mold means includes a plurality of elongated mold strips having a plurality of side-by-side said mold cups formed therein and wherein the upper end of each cup merges into a flange-like top wall.

3. The apparatus of claim 2 wherein said mold strips are carried in adjacent relation on said conveying means to form a series of said mold strips in said path of travel.

4. The apparatus of claim 3 wherein said top walls of said mold cups include cooperating overlapping portions between adjacent mold strips in said path of travel thereby to preclude upward spray of said refrigerated liquid past said upper ends of said cups.

5. The apparatus of claim 3 wherein said adjacent mold strips define parallel lines of depending mold cups in said path of travel and aligned parallel spaces between laterally adjacent sidewalls thereof, and wherein said nozzle means includes spaced nozzle elements for upward spraying of the refrigerated liquid into the aligned spaces between said cup sidewalls thereby to impinge against a portion of said cup top walls bridging said spaces.

* * * * *